United States Patent [19]

Sweers

[11] Patent Number: 5,111,554
[45] Date of Patent: May 12, 1992

[54] HOLD-DOWN STRAP FOR A TARP

[76] Inventor: Ronald L. Sweers, 6165 E. Atherton Rd., Flint, Mich. 48507

[21] Appl. No.: 390,198

[22] Filed: Aug. 7, 1989

[51] Int. Cl.$^5$ .............................................. B60P 7/06
[52] U.S. Cl. ...................................... 24/16 R; 24/301
[58] Field of Search ............... 248/499; 296/191, 100; 52/3, 4; 410/96, 97; 24/16 R, 16 PB, 300, 301, 298, 302

[56] References Cited

U.S. PATENT DOCUMENTS

| | | | |
|---|---|---|---|
| 1,634,619 | 7/1927 | Lake | 24/301 |
| 2,819,650 | 1/1958 | Seron | 24/301 X |
| 3,186,704 | 6/1965 | McCloskey et al. | 24/300 X |
| 3,584,315 | 6/1971 | Hardy | |
| 3,615,117 | 10/1971 | Neidlinger | |
| 3,627,376 | 12/1971 | Tyler | |
| 3,668,740 | 6/1972 | Pearson | 24/16 PB |
| 3,692,361 | 9/1972 | Ivarsson | 24/298 X |
| 4,111,132 | 9/1978 | Plut | 24/301 X |
| 4,155,636 | 5/1979 | Reeberg | 24/302 X |
| 4,234,224 | 11/1980 | Rosenvold | |
| 4,302,043 | 11/1981 | Dimmer et al. | |
| 4,505,512 | 3/1985 | Schmeichel et al. | |
| 4,769,875 | 9/1988 | Hartman | 24/300 |

Primary Examiner—James R. Brittain
Attorney, Agent, or Firm—Gifford, Groh, Sprinkler, Patmore and Anderson

[57] ABSTRACT

A hold-down strap for holding a tarp or the like comprises an elongated pliable body portion and two end portions fitted to the body portion. The end portions are elastic and are preferably composed of an elastomeric compound or a natural rubber. Along the free end of each end portion are situated a plurality of eyelet fasteners. Along the side edges of the body portion are fitted a plurality of eyelet fasteners. The body portion is itself composed of a webbed material such as cloth or a resin-permeated fiber glass mat. Cord may be used to interconnect the eyelets of one strap with those of another strap, with a tarp, or with a fixed object to thereby hold down a tarp or a similar covering.

13 Claims, 2 Drawing Sheets

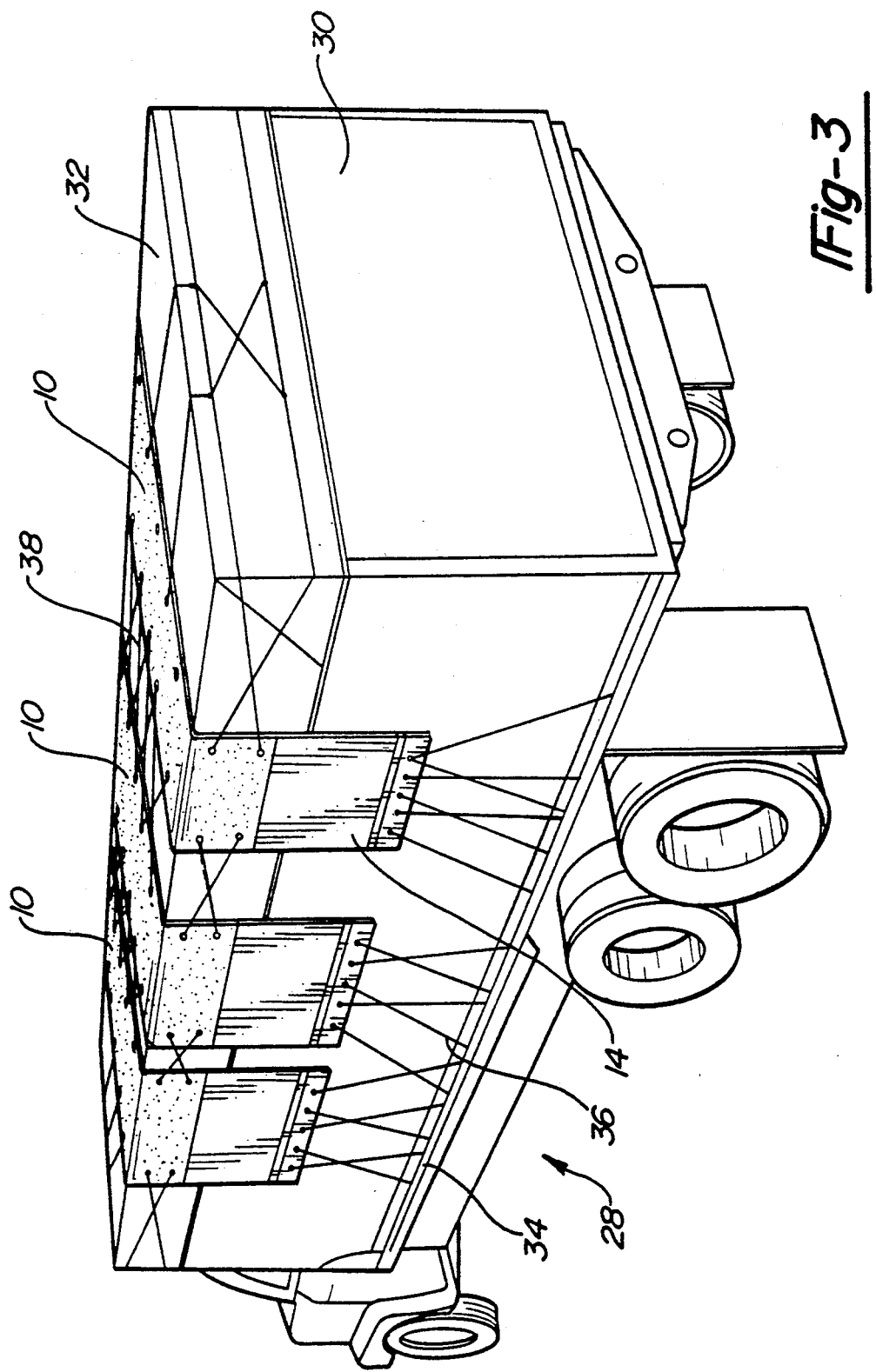

HOLD-DOWN STRAP FOR A TARP

BACKGROUND OF THE INVENTION

I. Field of the Invention

The present invention relates generally to straps for holding down a tarp or a similar covering. More particularly, the present invention relates to a tarp strap having a pliable body portion and two elastic end portions.

II. Description of the Relevant Art

A common and long-standing problem associated with the use of open-bed trucks of all sizes and shapes has been the covering of the bed itself. The need for such coverings is well known and continues to grow as many communities now require that refuse haulers be covered while present therein.

In response to this problem, tarpaulins have generally been employed to cover the open beds of vehicles. However, such tarp coverings are generally cumbersome in that they must be large enough to adequately cover the bed and must be heavy enough to be weatherproof.

The greatest problem of the tarp is the task of holding it in place because of its substantial configuration, at highway speeds the tarp tends to get blown about and often severely flaps or twists.

Conventional responses to this problem have been generally inadequate and usually include a rope, cord or similar fastener for tying a tarp in place. However, because neither the tarp nor the rope has elastic characteristics, the tarp often cannot be secured tautly enough to prevent its shifting or billowing.

Accordingly, prior approaches to providing a method whereby a tarp is held firmly in place have generally failed.

SUMMARY OF THE PRESENT INVENTION

The present invention provides a hold-down strap for holding in place a tarpaulin or a similar covering. The strap includes an elongated and pliable strap body portion having two end portions fitted thereto. The end portions are elastic and are preferably composed of an elastomeric compound or a natural rubber.

Along the free end of each end portion are situated a plurality of eyelet fasteners. Along the side edges of the body portion are a plurality of eyelet fasteners.

The body portion is composed of a pliable material. The material is preferably webbed to increase strength, and, although a webbed material such as a canvas may be used, a resin-permeated fiber glass matting is the material of choice. The fiber glass construction offers numerous advantages including pliability, durability and water- and weather-resistance.

The combination of eyelets allows the hold-down strap to be employed in a variety of circumstances where tarps or similar coverings are used. The construction of the strap allows for the strap to assist in holding down a tarp partially by the mass of the strap body and ends. When used, for example, in the covering of a large tandem trailer-truck having an open bed, the mass of the strap is useful in minimizing flapping, shifting or billowing commonly related to coverings for these vehicles.

Because of the eyelets, the strap may be tied to other straps or may be tied to a fixed article. When, for example, the covering is used on an open truck, a number of straps may be placed over the tarp in a side to side pattern. The straps may be tied to one another or to the side of the vehicle.

The strap may also be used in other places where tarps or similar coverings are used. For example, where tarps are used at construction sites to cover wood or other materials, the straps may be placed over tarps lying thereover and may be anchored by stakes.

In any use, the hold-down strap of the present invention provides an elastic construction that allows for the strap to be stretched over whatever it is placed over, there by assuring that the tarp does not shift or become loose.

Other advantages and features of the present invention will become apparent from the following detailed description when read in conjunction with the accompanying drawing.

BRIEF DESCRIPTION OF THE DRAWING

The present invention will become more fully understood by reference to the following detailed description of the preferred embodiments of the present invention when read in conjunction with the accompanying drawing, in which like reference characters refer to like parts throughout the views, and in which:

FIG. 3 is a perspective view of three hold-down straps of the present invention in place over a tarp-covered truck.

DETAILED DESCRIPTION OF THE PREFERRED EMBODIMENT OF THE PRESENT INVENTION

Figure 1:
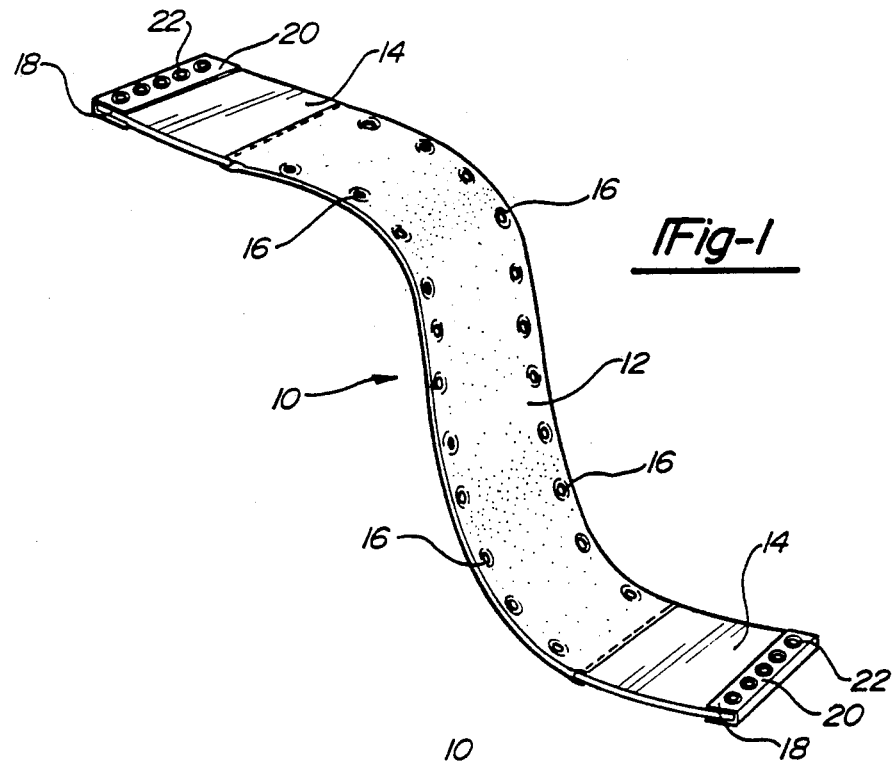
FIG. 1 is a perspective view of a hold-down strap according to the invention.

The drawing discloses the preferred embodiment of the present invention. While the configurations according to the illustrated embodiment is preferred, it is envisioned that alternate configurations of the present invention may be adopted without deviating from the invention as portrayed. The preferred embodiment is discussed hereafter.

Referring to FIG. 1, a hold-down strap according to the present invention is shown, generally referred to as 10. The strap 10 includes an elongated and pliable central body portion 12 preferably composed of a durable webbed material such as resin-permeated fiber glass matting.

Situated at end of the ends of the body portion 12 are a pair of end portions 14. The end portions 14 are composed of an elastomeric compound or a natural rubber. In any event, the end portions 14 are elastic.

Along the approximate edges of the body portion 12 are situated a number of body eyelets 16. While the illustrated number of eyelets 16 may be varied, enough of the eyelets 16 are provided so that the strap 10 may be securely attached to other straps or to fixed points on a truck or to other places. Of course, the inclusion of the eyelets 16 is only preferred, as other fastening methods such as belts, buttons or snap-fasteners may be employed.

Each end portion 14 includes a free end 18. For added strength each free end 18 preferably includes an overlapped covering 20.

Along the overlapped covering are situated a number of end eyelets 22. Again, like the body eyelets 16, the number of end eyelets 22 may be varied. The eyelets 22 may also be substituted with other fasteners as described above with respect to the body eyelets 16.

Although the dimensions of the strap 10 may be varied as required to best suit the applied use, the overall dimensions are preferably two feet in width and ten feet in length, each of the end portions 14 also being two feet in length.

Figure 2:
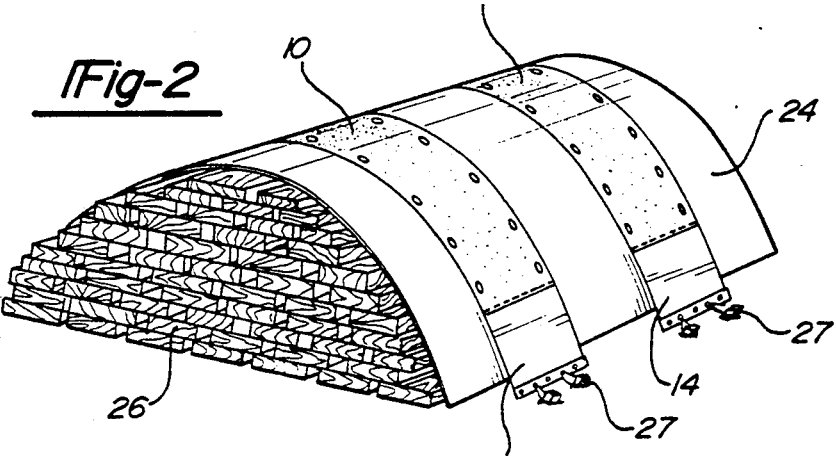
FIG. 2 is a perspective view of a pair of hold-down straps of the present invention in place over a tarp-covered wood pile.

Referring to FIG. 2, a preferred use of the strap 10 is illustrated. In this use the strap 10 is stretchably fitted over a tarp 24 set in place over a pile of wood 26. The end portions 14 of the straps 10 are here held in place by a number of anchoring stakes 27. The strap 10 thus may be useful in a variety of functions at job sites and may be also used to hold down a tarp over an unprotected roof structure or the like.

Referring to FIG. 3, the preferred use of the straps 10 is herein illustrated. According to this figure, a truck, generally indicated as 28, is illustrated and includes an open bed 30.

Over the top of the bed 30 is fitted a tarp 32. The tarp 32 is overlaid with a number of straps 10 that have been situated transversely with respect to the length of the truck 28.

The straps 10 are stretchably attached to a rail 34 conventionally provided on trailers by a number of ropes or cords 36. By the elasticity of the end portions 14, the ropes 36 hold the straps 10 taughtly, regardless of the shifting or movement of the bed 30.

Interconnecting the straps 10 are a number of interconnecting ropes 38. By interconnection of the straps 10 with one another and by tying the ropes 38 around the ends of the bed 30 as illustrated, billowing or flapping of the tarp 32 is eliminated or greatly reduced.

Of course, a greater or lesser number of the straps 10 may be used other than as shown depending upon the size of the bed 30. Where greater security is desired the straps 10 may be doubled up.

Figure 4:
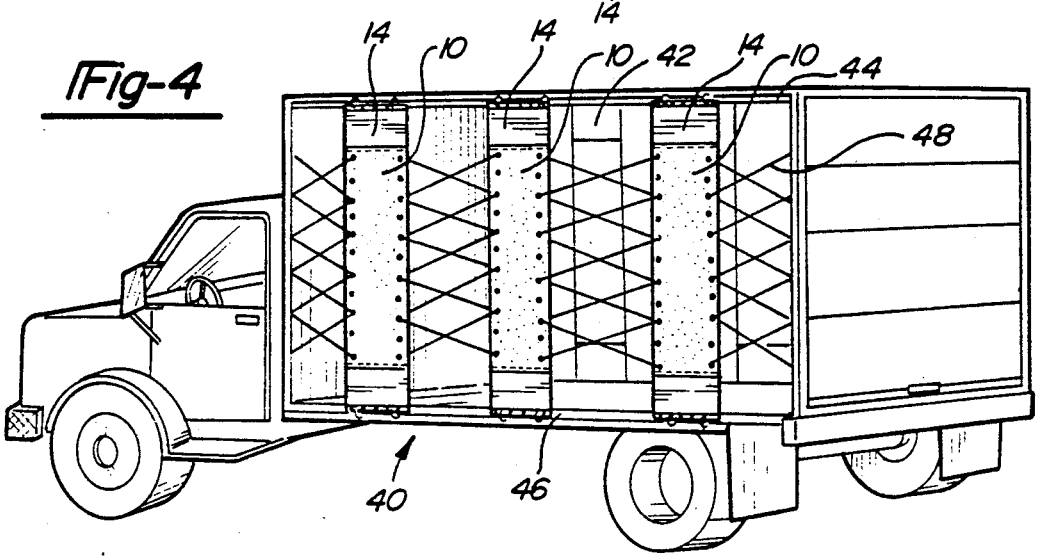
FIG. 4 is a perspective view of a number of hold-down straps in place holding the side coverings of a truck.

Referring to FIG. 4, an alternate application of the straps 10 is illustrated. FIG. 4 illustrates an open-sided truck, generally indicated as 40 having a number of the straps 10 fitted to the side. The straps 10 are used to hold down a side covering 42 against the side of the truck 40.

The end portions 14 of the straps 10 are connected to an upper rail 44 or a lower rail 46. Again, like the use illustrated in FIG. 3, the straps 10 are stretched into place.

To assist in keeping the side covering 42 in place, the straps 10 are interconnected to one another and to the truck 40 by means of a side fastening rope 48. Again, as with the use illustrated in FIG. 3, a greater or lesser number of the tarps 10 may be used as need requires.

Having described my invention, however, many modifications thereto will become apparent to those skilled in the art to which it pertains without deviation from the spirit of the invention as defined by the scope of the appended claims.

I claim:

1. A hold-down strap for holding a tarp or the like, said strap comprising:
    an elongated pliable body portion having a first edge and a second edge;
    a pair of elastic ends interconnecting said body portion;
    said elastic ends including a multiplicity of means for attaching;
    said body portion being composed of a webbed material; and
    said webbed material comprises a resin-permeated fiber glass mat.

2. A hold-down strap for holding a tarp or the like, said strap comprising:
    an elongated pliable body portion composed of a non-elastic material having a first end and a second end;
    a first elastic end portion having a body attachment end and a connecting end; and
    a second elastic end portion having a body attachment end a connecting end;
    said body attachment end of said first elastic end portion being attached to said first end of said body portion;
    said body attachment end of said second elastic end portion being attached to said second end of said body portion; and
    said body portion having a plurality of means for attaching.

3. The strap of claim 2 wherein said connecting ends of said first and second end portions include said means for attaching.

4. The strap of claim 3 wherein said means for attaching comprises a plurality of eyelets.

5. The strap of claim 2 wherein said body portion comprises a first edge and a second edge.

6. The strap of claim 5 wherein said body portion includes multiple linearly arranged means for attaching.

7. The strap of claim 6 wherein said means for attaching comprises a plurality of eyelets.

8. The strap of claim 7 wherein said eyelets are fixed substantially along said first and second edges.

9. The strap of claim 2 wherein said body portion comprises a webbed material.

10. The strap of claim 9 wherein said webbed material is a cloth.

11. The strap of claim 9 wherein said webbed material is a resin-permeated fiber glass mat.

12. The strap of claim 2 wherein said first and second elastic end portions are composed of an elastomeric compound.

13. The strap of claim 2 wherein said first and second elastic end portions are composed of a natural rubber.

* * * * *